United States Patent [19]

Fried

[11] Patent Number: 4,764,738
[45] Date of Patent: Aug. 16, 1988

[54] AGILE BEAM CONTROL OF OPTICAL PHASED ARRAY

[75] Inventor: David L. Fried, Placentia, Calif.

[73] Assignee: D. L. Fried Associates, Inc., Placentia, Calif.

[21] Appl. No.: 31,525

[22] Filed: Mar. 26, 1987

[51] Int. Cl.$^4$ .......................... G02B 5/174; H01S 3/02
[52] U.S. Cl. ..................... 332/7.51; 342/376; 350/96.14
[58] Field of Search ............... 330/4.3; 332/7.51; 342/372, 373, 376; 350/96.14

[56] References Cited

U.S. PATENT DOCUMENTS

| | | | |
|---|---|---|---|
| 3,339,151 | 8/1967 | Smith | 350/96.14 |
| 3,484,785 | 12/1969 | Sheldon et al. | 342/372 |
| 3,680,110 | 7/1972 | Goldstone | 342/373 |
| 3,691,483 | 9/1972 | Klein | 332/7.51 |
| 3,764,213 | 10/1973 | O'Meara | 332/7.51 X |
| 3,868,695 | 2/1975 | Kadak | 342/373 X |
| 3,954,323 | 5/1976 | Andrews et al. | 350/96.18 X |
| 4,056,304 | 11/1977 | Phillips | 350/96.14 |
| 4,150,382 | 4/1979 | King | 342/376 X |
| 4,439,016 | 3/1984 | Ogland et al. | 350/356 |
| 4,462,658 | 7/1984 | Scifres et al. | 350/96.14 |
| 4,499,437 | 2/1985 | Blazey | 332/7.51 |
| 4,620,193 | 10/1986 | Heeks | 342/200 |
| 4,652,883 | 3/1987 | Andricos | 342/372 |
| 4,661,786 | 4/1987 | Bender | 330/4.3 X |
| 4,671,620 | 6/1987 | Yao | 350/358 |

Primary Examiner—Thomas H. Tarcza
Assistant Examiner—Mark Hellner
Attorney, Agent, or Firm—Harvey C. Nienow

[57] ABSTRACT

An agile beam control for optical phased array wherein a great multiplicity of substantially identical wave guides are employed, each of which comprises a plurality of electrodes along the length thereof, and wherein electrical voltages are applied to such electrodes in a predetermined pattern so as to effect the necessary control without creating a totally unworkable arrangement of different voltages and wiring arrangements which are intolerable. More specifically, a binary voltage distribution is provided to such electrodes, whereby alternate ones of the electrodes in a first electrode position of such wave guides are interconnected and have a given voltage applied thereto. The remaining electrodes at that position are energized with the same magnitude of voltage but of reverse polarity. Each successive electrode position of such wave guides are arranged in blocks of adjacent electrodes wherein each block comprises twice the number of electrodes in each block of the adjacent electrode position closest to said first electrode position. Alternate blocks of electrodes are connected together and voltage is applied to each block in accordance with the number of electrodes in the respective blocks, with alternate blocks having reverse polarity.

8 Claims, 2 Drawing Sheets

| Waveguide | Electrode | | | | |
|---|---|---|---|---|---|
| | 1 | 2 | 3 | 4 | 5 |
| 1 | $+V_1$ | $+V_2$ | $+V_3$ | $+V_4$ | $+V_5$ |
| 2 | $-V_1$ | $+V_2$ | $+V_3$ | $+V_4$ | $+V_5$ |
| 3 | $+V_1$ | $-V_2$ | $+V_3$ | $+V_4$ | $+V_5$ |
| 4 | $-V_1$ | $-V_2$ | $+V_3$ | $+V_4$ | $+V_5$ |
| 5 | $+V_1$ | $+V_2$ | $-V_3$ | $+V_4$ | $+V_5$ |
| 6 | $-V_1$ | $+V_2$ | $-V_3$ | $+V_4$ | $+V_5$ |
| 7 | $+V_1$ | $-V_2$ | $-V_3$ | $+V_4$ | $+V_5$ |
| 8 | $-V_1$ | $-V_2$ | $-V_3$ | $+V_4$ | $+V_5$ |
| 9 | $+V_1$ | $+V_2$ | $+V_3$ | $-V_4$ | $+V_5$ |
| 10 | $-V_1$ | $+V_2$ | $+V_3$ | $-V_4$ | $+V_5$ |
| 11 | $+V_1$ | $-V_2$ | $+V_3$ | $-V_4$ | $+V_5$ |
| 12 | $-V_1$ | $-V_2$ | $+V_3$ | $-V_4$ | $+V_5$ |
| 13 | $+V_1$ | $+V_2$ | $-V_3$ | $-V_4$ | $+V_5$ |
| 14 | $-V_1$ | $+V_2$ | $-V_3$ | $-V_4$ | $+V_5$ |
| 15 | $+V_1$ | $-V_2$ | $-V_3$ | $-V_4$ | $+V_5$ |
| 16 | $-V_1$ | $-V_2$ | $-V_3$ | $-V_4$ | $+V_5$ |
| 17 | $+V_1$ | $+V_2$ | $+V_3$ | $+V_4$ | $-V_5$ |
| 18 | $-V_1$ | $+V_2$ | $+V_3$ | $+V_4$ | $-V_5$ |
| 19 | $+V_1$ | $-V_2$ | $+V_3$ | $+V_4$ | $-V_5$ |
| 20 | $-V_1$ | $-V_2$ | $+V_3$ | $+V_4$ | $-V_5$ |
| 21 | $+V_1$ | $+V_2$ | $-V_3$ | $+V_4$ | $-V_5$ |
| 22 | $-V_1$ | $+V_2$ | $-V_3$ | $+V_4$ | $-V_5$ |
| 23 | $+V_1$ | $-V_2$ | $-V_3$ | $+V_4$ | $-V_5$ |
| 24 | $-V_1$ | $-V_2$ | $-V_3$ | $+V_4$ | $-V_5$ |
| 25 | $+V_1$ | $+V_2$ | $+V_3$ | $-V_4$ | $-V_5$ |
| 26 | $-V_1$ | $+V_2$ | $+V_3$ | $-V_4$ | $-V_5$ |
| 27 | $+V_1$ | $-V_2$ | $+V_3$ | $-V_4$ | $-V_5$ |
| 28 | $-V_1$ | $-V_2$ | $+V_3$ | $-V_4$ | $-V_5$ |
| 29 | $+V_1$ | $+V_2$ | $-V_3$ | $-V_4$ | $-V_5$ |
| 30 | $-V_1$ | $+V_2$ | $-V_3$ | $-V_4$ | $-V_5$ |
| 31 | $+V_1$ | $-V_2$ | $-V_3$ | $-V_4$ | $-V_5$ |
| 32 | $-V_1$ | $-V_2$ | $-V_3$ | $-V_4$ | $-V_5$ |

FIG. 5

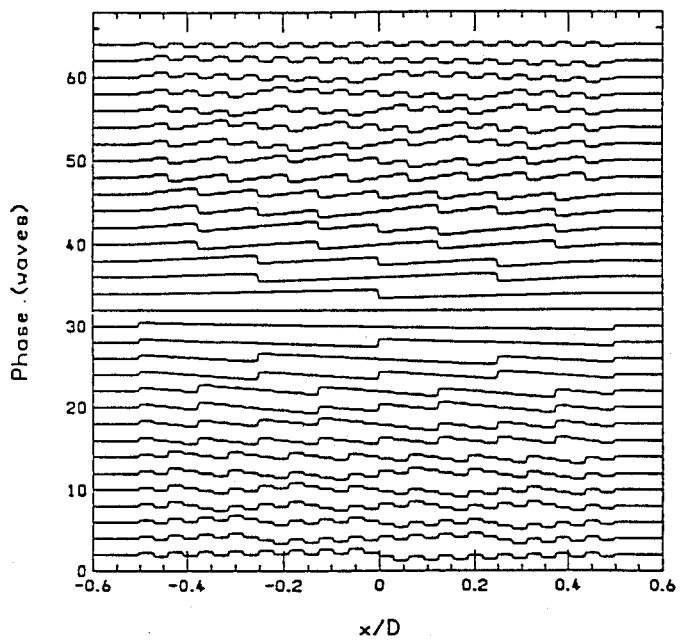

FIG. 6

AGILE BEAM CONTROL OF OPTICAL PHASED ARRAY

The present invention relates generally to an agile beam control of optical phased array, but more particularly to a control for an array having a very large number of emitting elements and wherein the energizing system therefor is not complicated and cumbersome.

BACKGROUND OF THE INVENTION

Heretofore, phase array microwave radar has been provided wherein the energy from each emitter element is independently phase shifted so that the ratio of scan angle to beam spread is equal to the number of emitter elements in the array. Such agile beam scanning can also be provided for an optical phased array. However, with the exceedingly large number of emitting elements to be utilized in an optimum or desirable optical phased array, various problems arise due to the number of such emitting elements and the number of control elements required.

The most straight forward approach to steering the beam of a phased array is to introduce a linearly varying phase shift across the array.

Due to the unusually large number of emitter elements in an optical phased array, the standard approach to agile beam steering as found in phase array microwave radar becomes unworkable.

OBJECTS OF THE INVENTION

It is an object of the present invention to provide a control for optical phased array which is practical and workable even though the array has an unbelievably large number of emitters.

Another object of the present invention is to provide a control for optical phased array as characterized above wherein the control electrodes of the emitters are connected together in a predetermined pattern such that energization of such electrodes does not become cumbersome and difficult.

Another object of the present invention is to provide a control for optical phased array as characterized above wherein the electrodes are connected together in accordance with binary progression, and wherein such progression is also used in applying voltages to the particular electrodes.

Another object of the present invention is to provide a control for optical phased array as characterized above which utilizes emitters in association with wave guides having a multiplicity of oppositely disposed pairs of electrodes along the length of such wave guides, and wherein the interconnection of such electrodes and the energization patterns therefor are such as to enable the beam to be shifted in accordance with a predetermined pattern.

A still further object of the present invention is to provide a control for optical phased array as characterized above wherein all electrodes at the first electrode position of a multiplicity of wave guides are alternately connected together to provide a predetermined pattern, and wherein alternate ones of such electrodes are energized with control voltages with such interconnection affording alternate electrodes with control voltages of opposite polarity.

An even still further object of the present invention is to provide a control for optical phased array as characterized above wherein succeeding electrode positions on such wave guides have their electrodes arranged in blocks which differ from one electrode position to another in accordance with binary progression.

A still further object of the present invention is to provide a control for optical phased array as characterized above which is capable of providing a controllable agile beam array which is not encumbered or inundated by complex wiring and energizing schemes.

Another even still further object of the present invention is to provide a control for optical phased array as characterized above which is practical and workable and which is rugged and dependable in operation.

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in combination with the accompanying drawings, in which:

FIG. 5 is a chart or tabulation of the energization pattern for electrodes in a plurality of wave guides; and FIG. 6 is a diagram showing the phase distribution obtainable at the output of the array for various desired beam directions with the control according to the present invention.

Like reference characters indicate corresponding parts throughout the several views of the drawings.

DESCRIPTION OF THE PREFERRED EMBODIMENT

Figure 1:
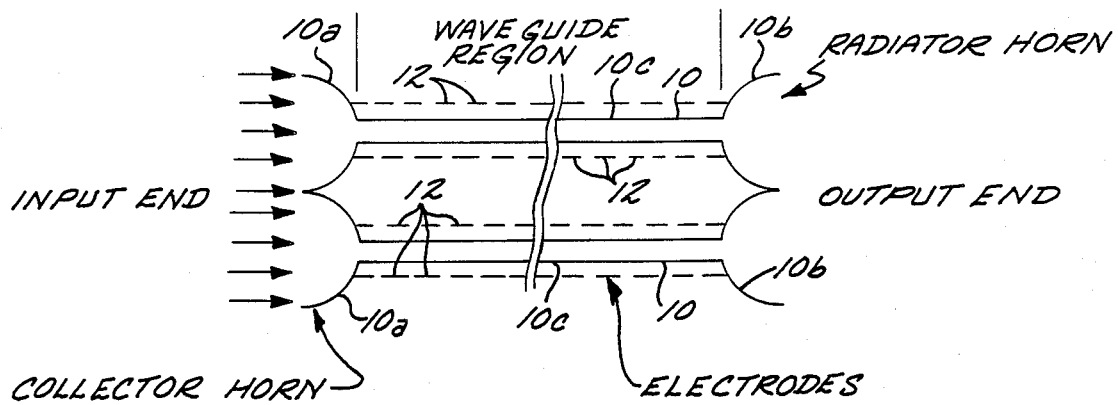
FIG. 1 is a diagramatic showing of adjacent wave guides in an array according to the present invention.

Referring to FIG. 1 of the drawings, there is shown therein several wave guides 10 each of which is formed with an input horn 10a and an output horn or radiator 10b. Such wave guides are positioned adjacent each other in a three-dimensional pattern as shown most particularly in FIG. 3 of the drawings with the radiator horn 10b of each wave guide 10 juxtaposed to adjacent wave guides to provide an array 14 for outputting energy as will hereinafter appear in greater detail. Such wave guides may be formed by doping lithium niobate or some comparable electro-optical material.

Figure 3:
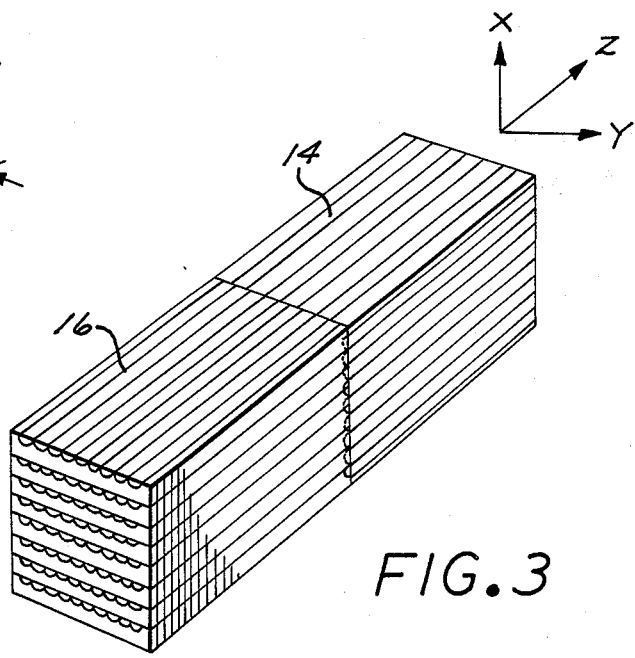
FIG. 3 is a perspective view of a multiplicity of emitters and wave guides arranged in three-dimensional pattern in accordance with the present invention.

As shown in FIG. 3, a plurality of plates, each of which contains a linear array of wave guides and horns are stacked in adjacent fashion to form a three-dimensional array 14. The array 14 is butted against a similar three-dimensional unit 16 which, however, is rotated 90 degrees relative to the array 14. The two units 14 and 16 are so butted that the output horns of unit 14 face the input horns of unit 16. The array 14 allows generation of phase shifts which cause the array's output beam to deflect in one plane, (horizontal, for instance), and the array 16 allows generation of phase shifts which cause the beam to deflect in the orthogonal plane (vertical, for instance), so that together the two arrays deflect the beam in two dimensions.

The collector horns 10a at the input end of the array are to be sized to gather up all of the radiation emerging from the emitter region. This radiation is reduced or necked down by each collector horn to a few micrometers in cross-section as such radiation enters the wave guide region 10c. The radiation travels through the wave guide regions of the respective wave guides until it is radiated through the radiator horn to thereby provide radiation which completely fills the exit end or output end of the array. At least the radiator horns should be sized to be juxtaposed to each other at the output end of the array to thus provide an output end which is completely filled with radiation.

Each of the wave guides is provided with a plurality of control electrodes 12 along the length of the wave guide region to enable the energy traveling within the wave guide to be phase-shifted as will hereinafter appear. Since the wave guides are formed of lithium niobate or some other electro-optical material, a voltage applied across a pair of oppositely disposed electrodes on the wave guide causes a shift in the phase of the radiation coming out of the corresponding radiator horn. Because the wave guides have an extremely small opening in the wave guide region, only a few volts across a pair of electrodes is required to effectuate the desired phase shift. Also, such electrodes 12 may be very short in length, thus enabling several tens of pairs of electrodes 12 to be positioned on each wave guide throughout the length thereof.

Figure 2:
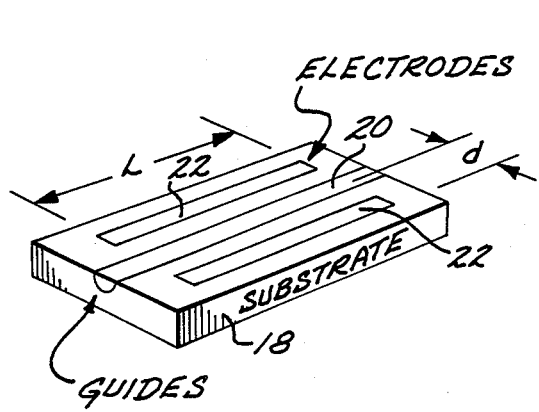
FIG. 2 is a perspective view of a substrate wherein wave guides and electrodes therefor are mounted.

FIG. 2 of the drawings is a representation of one form of physical arrangement for providing the wave guide region 10c of a wave guide. A pair of substrates 18 are provided in face-to-face relation (only one of which is shown in FIG. 2 of the drawings) to provide a three-dimensional piece of electro-optical material from which the wave guide 20 and electrode 22 may be formed. The central electrodes 12 are positioned adjacent to the wave guide 20 such that predetermined voltages across oppositely disposed electrodes cause predetermined shift in phase of the energy traversing such wave guide.

If voltages are applied to such electrodes so as to provide a linearly varying phase shift from wave guide to wave guide, only a very small amount of phase shift could be effected, thus providing an insufficient amount of steering of the output beam from the array over a very large angle. However, by interconnecting the electrodes 12 in a predetermined pattern or arrangement, and by thereafter energizing such electrodes in a correspondingly unique voltage pattern, sufficient phase shift can be effected in the energy to allow sufficient steering of the output beam from the array.

Figure 4:
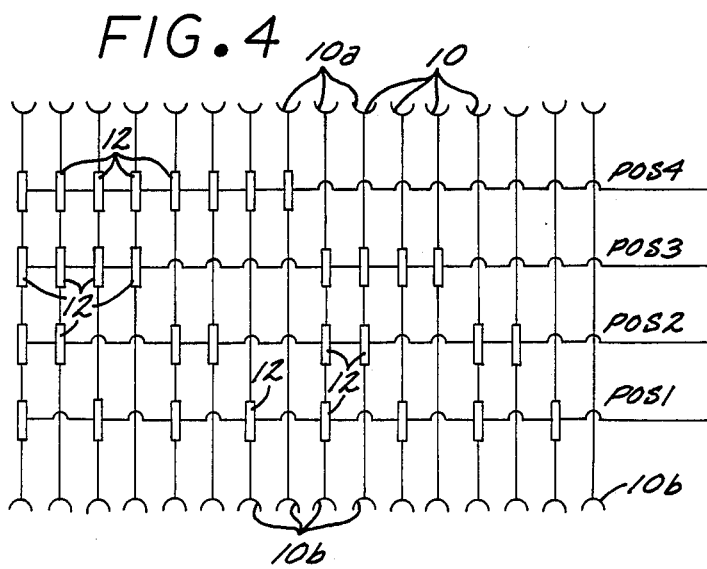
FIG. 4 is a diagramatic showing of the pattern for energizing electrodes in accordance with the present invention.

As shown in FIG. 4 of the drawings, the pairs of electrodes 12 in the first electrode position, namely Pos 1 on all of the wave guides have alternate ones of such electrode pairs connected together. It should be noted that in FIG. 4 individual electrodes of each pair are not shown, but rather a single representation is designated with the reference character 12 which in reality includes a pair of electrodes which are disposed on opposite sides of the wave guide region of the respective wave guide. Thus, the oppositely disposed electrodes which form a pair of electrodes on each wave guide at the first electrode position, Pos 1, are connected as shown diagrammatically in FIG. 4. This arrangement is such that a voltage can thus be applied across these oppositely disposed electrodes, but only to alternate ones of the wave guides 10. In like fashion, but not shown in detail in FIG. 4 of the drawings, the alternate or intermediate ones of such electrode pairs at the electrode position, Pos 1, are connected together such that a different voltage can be applied thereto, as will hereinafter become more apparent.

As further shown in FIG. 4, the pairs of electrodes 12 in the next or adjacent electrode position, Pos 2, on the multiplicity of wave guides forming the subject optical array, are connected together in blocks with the number of pairs of electrodes in each block being twice the number of electrodes in each block in the electrode position, Pos 1. That is, in electrode position Pos 1, one pair of electrodes 12 constitute a block and hence alternate blocks are connected together in position Pos 1 as above explained. In like fashion, in electrode position Pos 2, alternate blocks of electrode pairs are connected together to enable all of such interconnected electrodes to be simultaneously energized from a single source only in position Pos 2, there are twice as many pairs of electrodes in each block as appears in position Pos 1.

Continuing, the pairs of control electrodes at position Pos 3 are also arranged in blocks but the number of pairs of electrodes in each block of position Pos 3 is twice the number of pairs of electrodes in each block of position Pos 2. And further, alternate blocks of electrode pairs at position Pos 3 are connected together. As seen in FIG. 4, electrode position Pos 4, the next position or row of electrode pairs has its electrodes interconnected to form blocks comprising eight adjacent electrode pairs each with alternate blocks again being connected together. This arrangement is a continuation of the binary progression in that the blocks are made up of twice the number of electrode pairs in the blocks of the preceding electrode position.

These blocks of control electrodes along the lengths of the wave guides are energized in a predetermined manner, again in accordance with a binary progression system. That is, as shown in FIGS. 4 and 5, the electrodes in position Pos 1 are energized with voltage $V_2$. Although not shown in FIG. 4, but clearly indicated in the tabulation of FIG. 5, the alternate electrodes or blocks which are formed as above described, are energized with the same magnitude of voltage, but with the opposite polarity. That is, all of the electrodes in a given electrode position are energized with the same amount of voltage but the polarity of such voltage across the spaced electrodes of each pair is reversed from one adjacent pair or block to another.

For the electrodes in position Pos 2, the voltage is $V_2$ across the pairs of electrodes in the interconnected blocks of electrodes hereinabove described. The alternate blocks of electrodes are energized with voltage minus $V_2$ ($-V_2$). The blocks of interconnected electrodes at electrode position Pos 3 are energized with voltage $V_3$ with alternate blocks having reverse polarity, as above described. In like fashion, of course, the eight control electrodes in each block at position Pos 4 are energized with voltage $V_4$ with alternate blocks having reversed polarity. It should be noted that although FIG. 4 shows only four electrode positions, the chart of FIG. 5 shows five electrode positions.

The key to the successful operation of the device lies in the calculation of these voltages, i.e. $V_1$, $V_2$, $V_3$, etc. These voltages are set according to the following algorithm. For simplicity consider a one-dimensional array of $2^n$ wave guides capable of scanning the beam into $2^n$ distinct directions, i.e. the total scan range divided by $\lambda/D$ (where $\lambda$ is the optical wave length and D is the extent of the linear array of wave guides) is equal to $2^n$.

If it is desired to scan the beam to the $m^{th}$ position, the applied voltages for the $p^{th}$ set of electrodes would be calculated according to the formula $$V_P = \frac{1}{2}\left[\frac{m}{2^n}2^{P-1}\right]V_\lambda,$$

where the square brackets indicate that only the fractional part of the quantity in the brackets is to be retained, and $V_\lambda$ is the voltage required to produce a full wave, i.e. 360 degrees of phase shift.

The arrangement shown in the chart of FIG. 5 of the drawings is useable for only a rather small linear array, namely one consisting of only thirty-two wave guides and only five electrodes per wave guide. The voltages are restricted so that they will produce no more than plus or minus one-half wave of phase shift. The desired beam direction with only five electrodes is restricted to being one of thirty-two possible directions, is determined by suitably choosing each of the five control voltages. For thirty-two addressable beam control directions, there are only five voltages to be calculated, and for one thousand twenty-four directions there are only ten voltages to be calculated. Thus, even though a great many emitters are utilized in the array and each wave guide has a considerable number of control electrodes, the task of wiring the array and of providing voltages to the various electrodes becomes highly manageable.

FIG. 6 of the drawings shows the phase distribution across the output of the array.

Although I have shown and described certain specific embodiments of my invention, I am well aware that many modifications thereof are possible. The invention, therefore, is not to be restricted except insofar as is necessitated by the prior art and by the spirit of the appended claims.

I claim:

1. A control for optical phased array having a plurality of substantially identical waveguides each of which includes a multiplicity, i.e., first, second, third, ... etc. of pairs of electrodes located in corresponding first, second, third, ... etc. electrode-pair positions along the length thereof, comprising in combination, wiring means interconnecting the pairs of electrodes in the first electrode-pair position of said waveguides in such a manner that opposite polarity voltage may be applied to adjacent first pairs of electrodes each of said first pairs of electrodes thereby constituting a block, further wiring means interconnecting said pairs of electrodes in each remaining electrode-pair position (i.e., second, third, ... etc., positions) of said waveguides, in blocks of pairs of electrodes on adjacent waveguides at the respective electrode-pair position, wherein each block comprises twice the number of pairs of electrodes as are in each block of pairs of electrodes in the electrode-pair position to which this block's position is the successor position (e.g., fifth electrode-pair position is the successor position to the fourth electrode-pair position), with the pairs of electrodes in each block interconnected so that all pairs of electrodes in the respective block will have applied to them the same voltage polarity, said further wiring means also interconnecting said blocks so that the pairs of electrodes in adjacent blocks will have the opposite voltage polarity, and a source of electrical energy to energize the pairs of electrodes of the respective blocks of electrodes.

2. A control for optical phased array according to claim 1, wherein said source of electrical energy provides voltages for each electrode-pair position wherein the magnitude of said voltages differs from electrode-pair position to electrode-pair position in accordance with the number of pairs of electrodes in the respective blocks thereof.

3. A control for optical phased array according to claim 2, wherein said waveguides are arranged in rows to provide an array which is substantially square.

4. A control for optical phased array according to claim 3, wherein said waveguides are formed of electro-optical material.

5. A control for optical phased array according to claim 4, wherein said electro-optical material is lithium niobate.

6. A control for optical phased array according to claim 5, wherein each of said waveguides is formed with a collector horn.

7. A control for optical phased array according to claim 6, wherein the collector horn of each waveguide is exposed to the output of a laser diode.

8. A control for optical phased array according to claim 7, wherein each of said waveguides is formed with a radiator horn and said array is formed with the radiator horns in abutting side-by-side relation to substantially fill the area of the output end of the array.

* * * * *